(12) United States Patent
Chu (10) Patent No.: US 9,591,681 B2
(45) Date of Patent: Mar. 7, 2017

(54) METHOD AND RELATED COMMUNICATION DEVICE FOR CONFIGURING TIMING RESOURCE IN DEVICE TO DEVICE COMMUNICATION

(71) Applicant: HTC Corporation, Taoyuan County (TW)

(72) Inventor: Feng-Seng Chu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 307 days.

(21) Appl. No.: 14/339,473

(22) Filed: Jul. 24, 2014

(65) Prior Publication Data

US 2015/0030015 A1    Jan. 29, 2015

Related U.S. Application Data

(60) Provisional application No. 61/858,102, filed on Jul. 24, 2013.

(51) Int. Cl.
| | |
|---|---|
| *H04W 76/02* | (2009.01) |
| *H04W 72/04* | (2009.01) |
| *H04W 72/12* | (2009.01) |
| *H04W 56/00* | (2009.01) |
| *H04L 5/14* | (2006.01) |

(52) U.S. Cl.
CPC ..... *H04W 76/023* (2013.01); *H04W 56/0015* (2013.01); *H04W 72/0406* (2013.01); *H04W 72/1205* (2013.01); *H04W 72/1263* (2013.01); *H04W 76/025* (2013.01); *H04L 5/1469* (2013.01)

(58) Field of Classification Search
CPC . H04W 72/00; H04W 72/02; H04W 72/0406; H04W 72/04; H04W 72/0453; H04W 72/042; H04W 72/1205; H04W 76/00; H04W 76/02; H04W 76/023; H04W 76/025
See application file for complete search history.

(56) References Cited

U.S. PATENT DOCUMENTS

| | | |
|---|---|---|
| 2011/0255450 A1 | 10/2011 | Wang |
| 2012/0243431 A1 | 9/2012 | Chen |
| 2013/0114526 A1 | 5/2013 | Ahn |

(Continued)

FOREIGN PATENT DOCUMENTS

WO    2004103009 A1    11/2004

OTHER PUBLICATIONS

European Search report issued on Mar. 26, 2015 for EP application No. 14178323.3, filed Jul. 24, 2014.

(Continued)

*Primary Examiner* — Ashley Shivers
(74) *Attorney, Agent, or Firm* — Winston Hsu; Scott Margo (57) ABSTRACT

A method of configuring timing resource in device to device (D2D) communication for a first user equipment (UE) includes receiving a first signal from a second UE; and reporting to a network node at least one of information about an arriving time related to the first signal and information about prospective resource allocation of the first UE, whereby the network node configures timing resource for D2D communication between the first UE and the second UE.

20 Claims, 8 Drawing Sheets

(56) References Cited

U.S. PATENT DOCUMENTS

2013/0157670 A1* 6/2013 Koskela .............. H04W 74/006
  455/450
2013/0322276 A1* 12/2013 Pelletier .............. H04W 72/085
  370/252

OTHER PUBLICATIONS

European Search report issued on Nov. 6, 2014 for EP application No. 14178323.3, filing date Jul. 24, 2014, p. 1-5.

Qualcomm Incorporated, "Study on LTE Device to Device Proximity Services", 3GPP TSG RAN Meeting #58, RP-122009, 2012.

"Additional information: Group Communications & Proximity-based Services", Jul. 27, 2012, Critical Communications Broadband Group (CCBG), CCBG_LS12-001.

ETSI TC TETRA, "Information about the system improvements requirements for the adoption of LTE for mission/business critical communications", 3GPP TSG-SA WG1 Meeting #58, S1-121247, May 7-11, 2012, Seville, Spain, pp. 1-2.

* cited by examiner

METHOD AND RELATED COMMUNICATION DEVICE FOR CONFIGURING TIMING RESOURCE IN DEVICE TO DEVICE COMMUNICATION

CROSS REFERENCE TO RELATED APPLICATIONS

This application claims the benefit of U.S. Provisional Application No. 61/858,102, filed on Jul. 24, 2013 and entitled "Method and apparatus to configure timing resource for UEs in device to device communications", the contents of which are incorporated herein in their entirety.

BACKGROUND OF THE INVENTION

1. Field of the Invention

The present invention relates to a method utilized in a wireless communication system and communication device thereof, and more particularly, to a method of configuring timing resource for a wireless communication system supporting device to device communication and communication device thereof.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Starting from 3GPP Rel-12, a feature is included to allow UEs to communicate with each other directly, which is referred to as device to device (D2D) communication or Proximity-based Services (ProSe) communication. The D2D communication finds its applications on areas including Public Safety and non-Public-Safety services that would be of interest to operators and users. Proximity-based applications and services represent an emerging social-technological trend. The introduction of the D2D communication capability in LTE would allow the 3GPP industry to serve this developing market, and will, at the same time, serve the urgent needs of several Public Safety communities that are jointly committed to LTE.

In a half-duplex system, the UE is unable to transmit and receive at the same time. Therefore, when the UE is operated in a time division duplexing (TDD) mode, the UE cannot transmit data to the eNB while receiving data from other UEs at the same time, and vice versa. If both transmission and reception of D2D communication are carried on an uplink (UL) resource, reception of D2D communication might happen at the same time with normal UL transmission (i.e. UE to network transmission), and thus data collision may occur.

Therefore, how to configure timing resource in device to device (D2D) communication so as to avoid data collision is an important topic to be addressed and discussed in the art.

SUMMARY OF THE INVENTION

An objective of the present invention is to provide a method to configure timing resource so that data transmission/reception for D2D communication and normal communication do not interfere with each other.

The present invention discloses a method of configuring timing resource in device to device (D2D) communication for a first user equipment (UE). The method includes receiving a first signal from a second UE; and reporting to a network node at least one of an arriving time information and a prospective resource allocation information, whereby the network node configures timing resource for D2D communication between the first UE and the second UE; wherein the arriving time information is an information about an arriving time related to the first signal sent from the second UE, and the prospective resource allocation information is an information about prospective resource allocation of the first UE.

The present invention further discloses a method of configuring timing resource in device to device (D2D) communication for a network node. The method includes receiving a report from a first user equipment (UE) including at least one of an arriving time information and a prospective resource allocation information, wherein the first signal is a discovery signal sent to the first UE by a second UE; performing an estimation on whether a D2D subframe at the first UE overlap a normal uplink subframe according to the report; and configuring timing resource for D2D communication between the first UE and the second UE according to the estimation; wherein the arriving time information is an information about an arriving time related to the first signal sent to the first UE by the second UE, and the prospective resource allocation information is an information about prospective resource allocation of the first UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
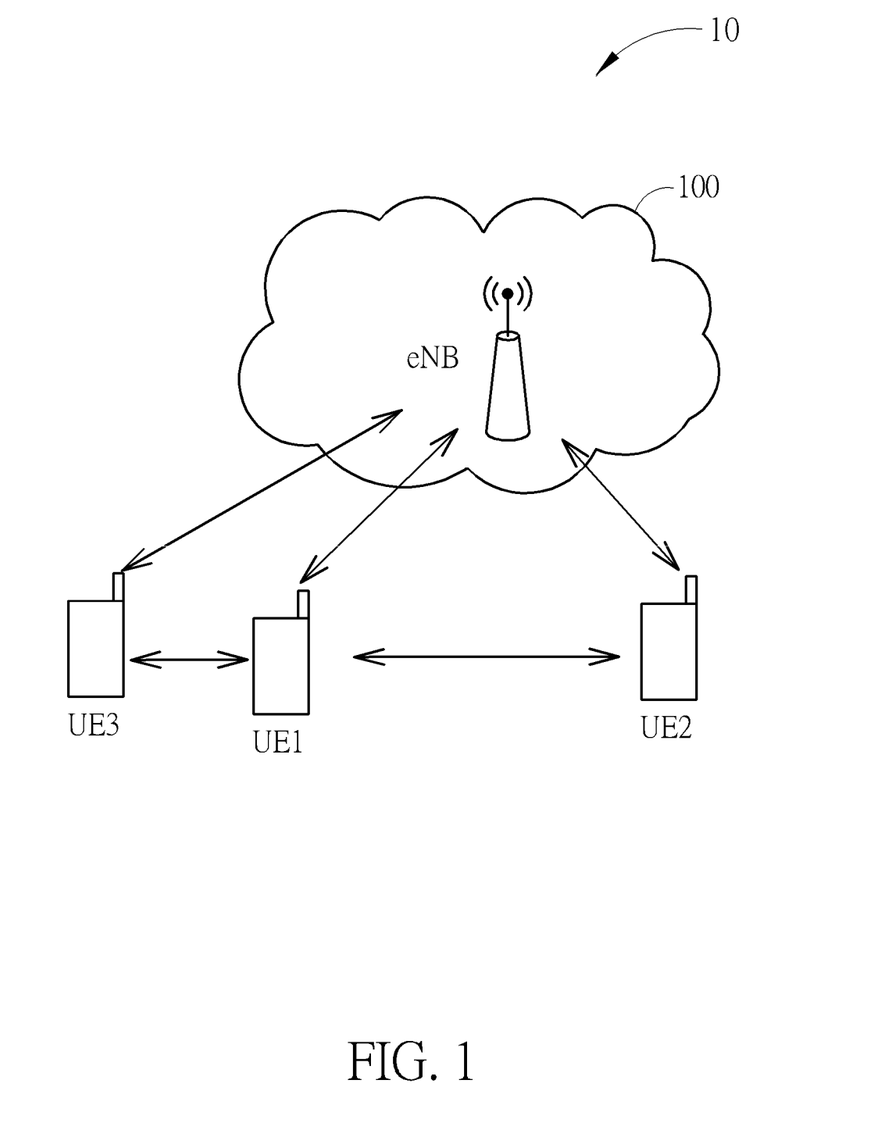
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network 100 and a plurality of user equipments (UEs) UE1-UE3. In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system. The UEs can be mobile devices such as mobile phones, laptops, tablet computers, electronic books, and portable computer systems. The number of UEs is not limited to the amount shown in FIG. 1. Besides, the network and the UE can be regarded as a transmitter or receiver depending on the transmission direction, e.g., for an uplink (UL), the UE is the transmitter and the network is the receiver, and for a downlink (DL), the network is the transmitter and the UE is the receiver.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

Figure 2:
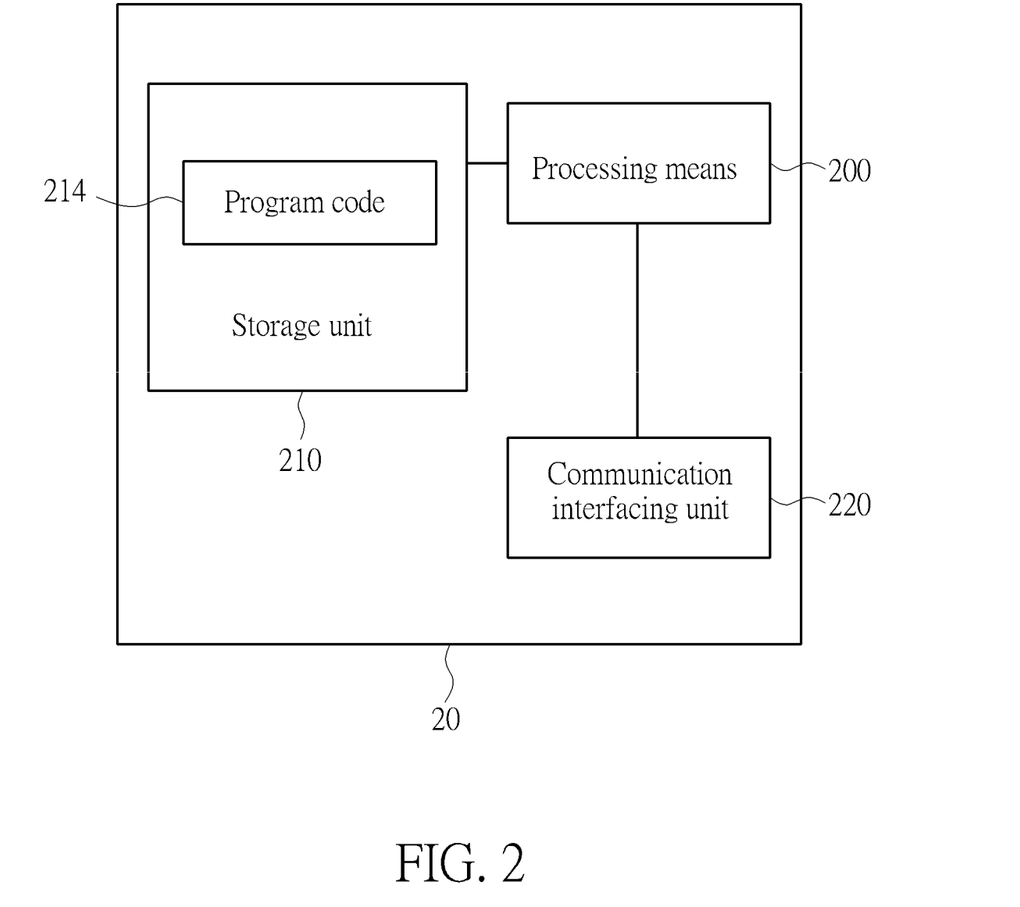
FIG. 2 is a schematic diagram of a communication device according to an example of the present invention.

Please refer to FIG. 2, which is a schematic diagram of a communication device 20 according to an example of the present invention. The communication device 20 can be the network or one of the UEs shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
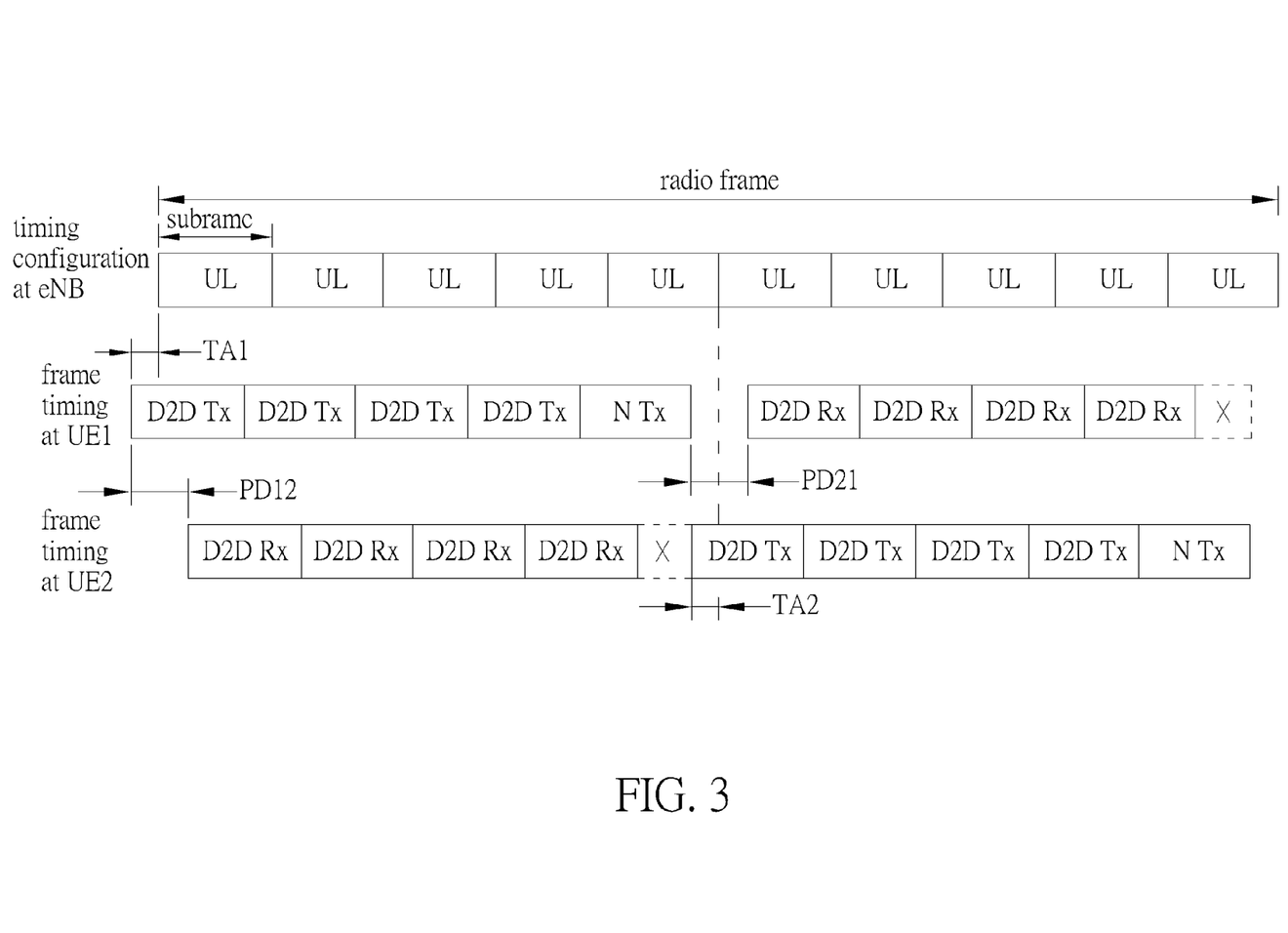
FIG. 3 is a timing diagram for the network node and the communication devices in the wireless communication system shown in FIG. 1 according to an example of the present invention.

In an aspect of the invention, each of the UEs UE1-UE3 may communicate with the network 100 in a frequency division duplexing (FDD) mode. The UEs are configured with a downlink (DL) spectrum and an uplink (UL) spectrum. The DL spectrum is used for receiving data from the network 100, and the UL spectrum is used for transmitting data to the network 100. In addition, there are D2D communications between UE1 and UE2 and between UE1 and UE3. Data for D2D communications are also carried on the UL spectrum in a time division duplexing (TDD) mode. FIG. 3 shows an example of frame timings at a network node in the network 100 and at the UEs, where "D2D TX" denotes the subframe is configured for D2D transmission, "D2D RX" denotes the subframe is configured for D2D reception, and "N TX" denotes the subframe is configured for normal UL transmission to the network. To alleviate interference to normal UL transmissions, the UE is configured with the same timing advance (TA) for both normal communication (i.e. UE to network communication) and D2D communication. On the other hand, the reception time for a D2D communication at a UE depends on the transmission distance between the transmitting UE and the receiving UE. Hence, a propagation delay (PD) is expected for receiving the D2D data at the receiving UE.

Figure 4:
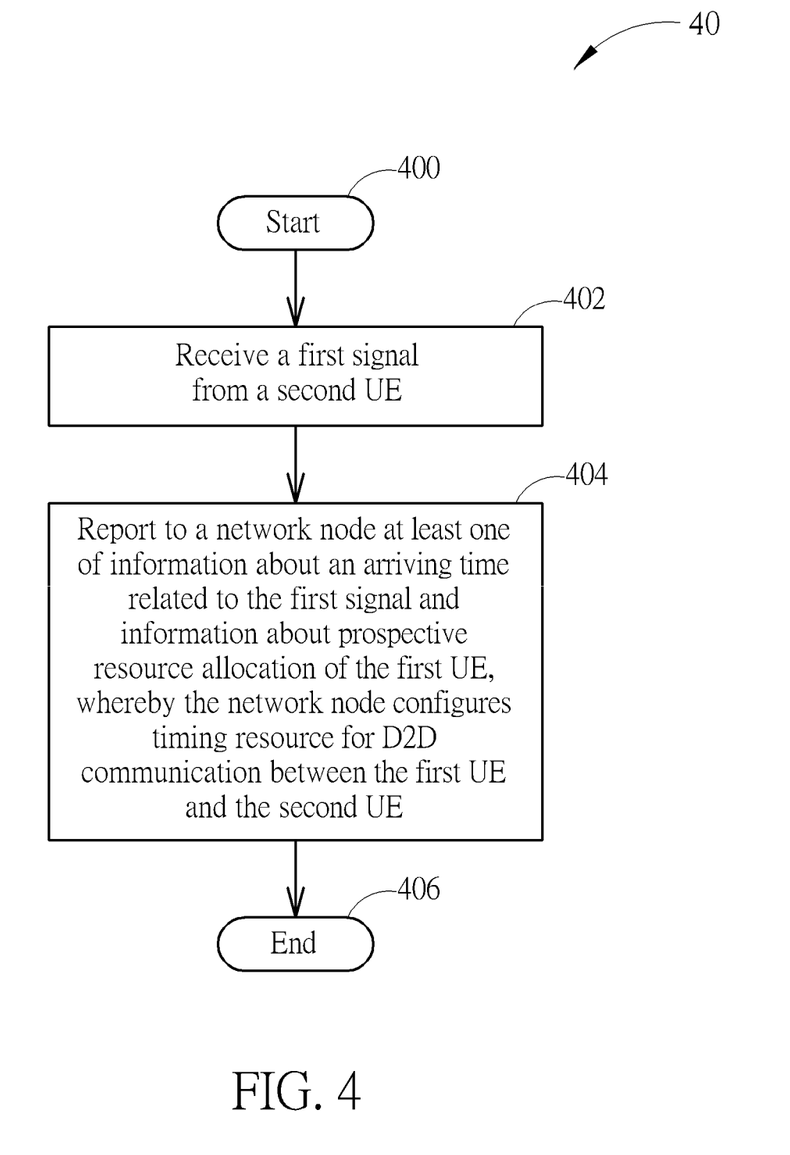
FIG. 4 is a flowchart of a process according to an example of the present invention.

Please refer to FIG. 4, which is a flowchart of a process 40 according to an example of the present invention. The process 40 may be utilized for a UE in a wireless communication system, such as the wireless communication system 10 shown in FIG. 1, for configuring timing resource in device to device (D2D) communication. The UE may be the UE1, UE2 or UE3 in the wireless communication system 10. The process 40 may be performed by the communication device 20 and may be compiled into the program code 214 to instruct the processing means 200 to execute the following steps:

Step 400: Start.

Step 402: Receive a first signal from a second UE.

Step 404: Report to a network node at least one of information about an arriving time related to the first signal and information about prospective resource allocation of the first UE, whereby the network node configures timing resource for D2D communication between the first UE and the second UE.

Step 406: End.

Figure 5:
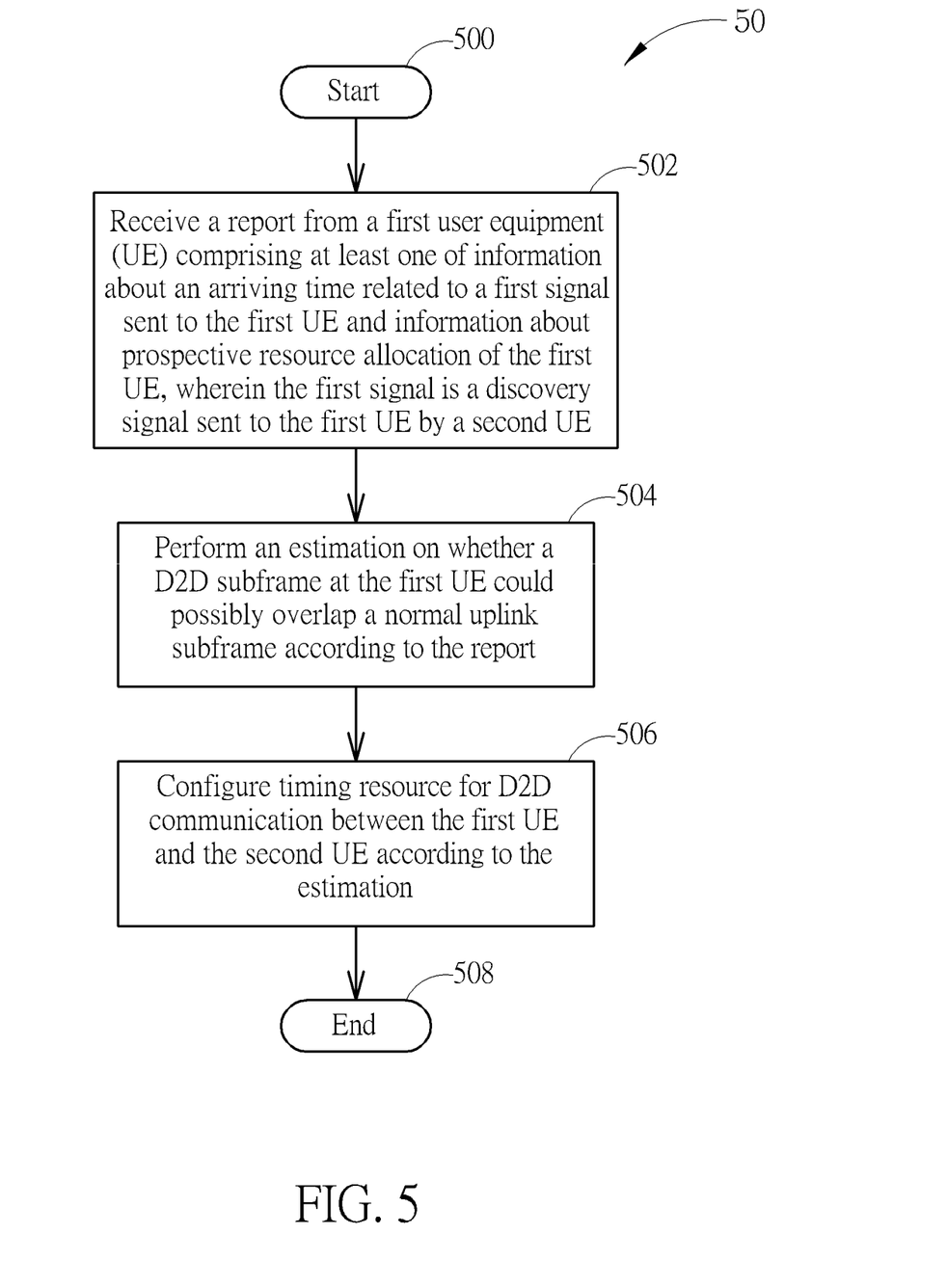
FIG. 5 is a flowchart of a process according to an example of the present invention.

Please refer to FIG. 5, which is a flowchart of a process 50 according to an example of the present invention. The process 50 may be utilized for a network node in a wireless communication system, such as the wireless communication system 10 shown in FIG. 1, for configuring timing resource in device to device (D2D) communication. The process 50 used for the network node may be in coordination with the process 40 used for a UE. The process 50 may be executed by a device which has similar structure of the communication device 20. The process 50 may be compiled into the program code 214 to instruct the processing means 200 to execute the following steps:

Step 500: Start.

Step 502: Receive a report from a first user equipment (UE) comprising at least one of information about an arriving time related to a first signal sent to the first UE and information about prospective resource allocation of the first UE, wherein the first signal is a discovery signal sent to the first UE by a second UE.

Step 504: Perform an estimation on whether a D2D subframe at the first UE could possibly overlap a normal uplink subframe according to the report.

Step 506: Configure timing resource for D2D communication between the first UE and the second UE according to the estimation.

Step 508: End.

According to the processes 40 and 50, the UEs are configured to communicate with each other directly in the wireless communication system 10. Each UE may be configured to transmit or broadcast a first signal for building up synchronization between UEs involving D2D communication. For example, before UE1 needs to communicate with UE2 directly, UE1 may receive the first signal from UE2, where the first signal may enable UE1 to derive the arriving time of signals transmitted by UE2. The first signal may be a discovery signal which is used by the UEs to discover each other in proximity directly. The discovery signal may be a primary synchronization signal (PSS), a secondary synchronization signal (SSS), a random access (RA) preamble, or any signal with similar functionality (e.g. ideal autocorrelation).

The resource on which the discovery signal is sent may be configured by the network. Configurations for the resource of the discovery signal include time domain resources (e.g. one or more subframes or slots), frequency domain resources (e.g. one or more resource blocks or resource elements), code domain resources (e.g. one or more sequences of digits and/or seeds to generate one or more sequences), and transmission parameters (e.g. D2D radio network temporary identifier (D2D-RNTI) or frame/subframe index). The discovery signal sent by each UE may be different. In an example, the discovery signals sent by different UEs may be orthogonal. The discovery signals may be sent by the UEs periodically.

Since the reception timing for D2D communication at each UE is determined by both the transmission timing of the transmitting UE and the transmission distance (or the propagation delay), the network needs to receive a report to obtain information about frame timing at the UE in order to prevent overlap of transmission and reception subframes. The UE may report the arriving time of the first signal and/or the information about perspective resource allocation to the network node after receiving the first signal from other UE. The information about the arriving time may be used by the network node to determine whether a D2D subframe at UE1 could possibly overlap a normal uplink subframe in the future. If the UE knows the timing advance of the other UE transmitting the first signal, the UE may predict the prospective resource allocation and provide its prediction to the network.

Referring back to the example shown in FIG. 3, there are 10 subframes in a radio frame, in which eight sub-frames are used for D2D communications between UE1 and UE2, and the other two subframes are left for potential normal communications. Among the eight subframes for D2D communications, four subframes are configured for transmissions from UE1 to UE2 while the other four subframes are configured for transmissions from UE2 to UE1. In this example, the relative locations of the network node, UE1, and UE2 may be referred to those depicted in FIG. 1. That is, the distance between the UE1 and the UE2 is longer than the distance between the UE1/UE2 and the network node. As shown in FIG. 3, the $5^{th}$ subframe at UE1 would not overlap the $6^{th}$ subframe which is used for D2D data reception from UE2. From the report, the network node is able to determine that the D2D transmission/reception would not interfere with the normal transmission/reception at UE1, so it may configure UE1 to utilize the $5^{th}$ subframe for uplink transmission to the network.

Figure 6:
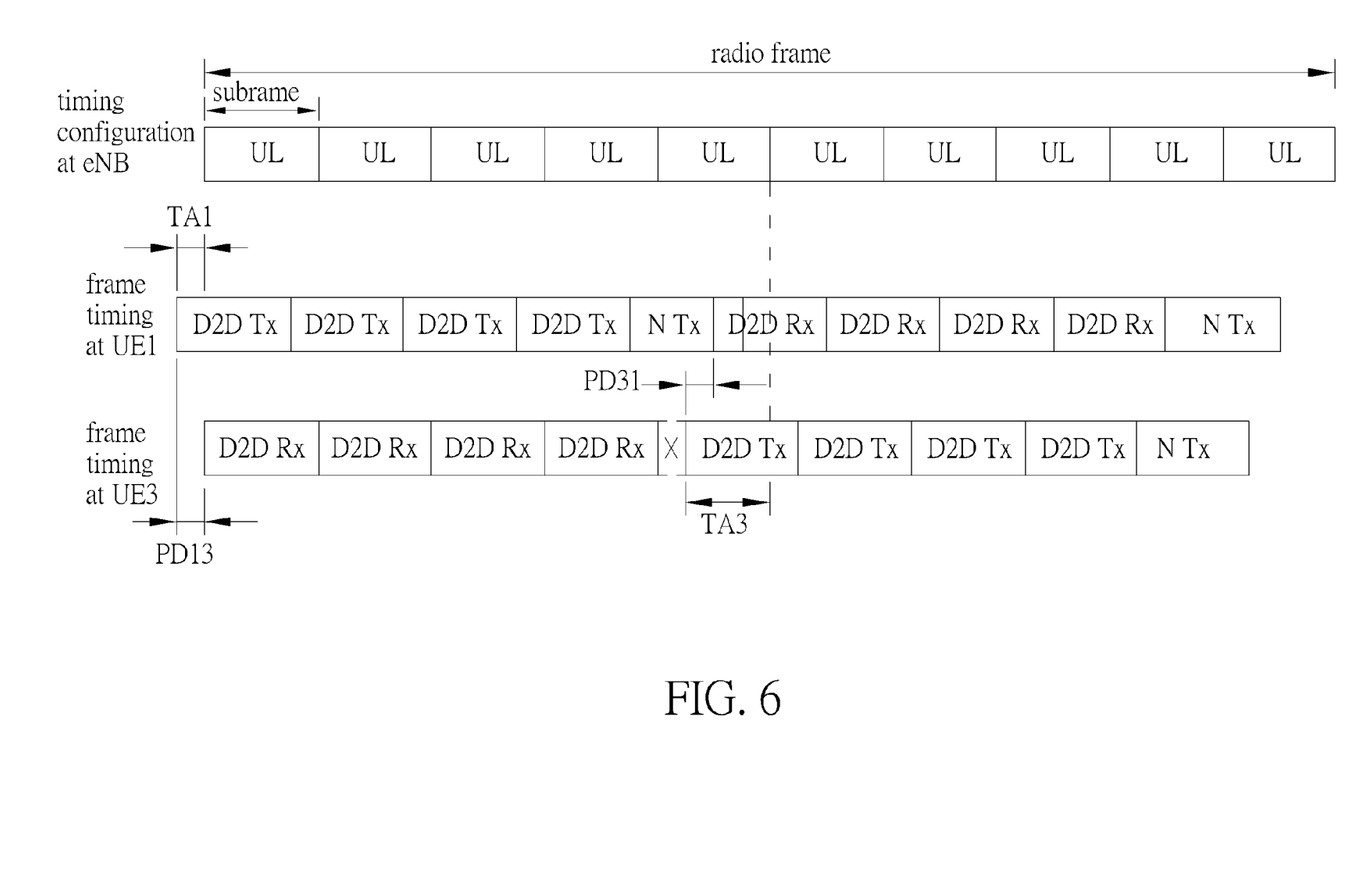
FIG. 6 is a timing diagram for the network node and the communication devices in the wireless communication system shown in FIG. 1 according to an example of the present invention.

FIG. 6 is another example which shows the frame timing of UE1 and UE3. In this example, there are 10 subframes in a radio frame, in which eight sub-frames are used for D2D communications between UE1 and UE3, and the other two subframes are left for potential normal communications. Among the eight subframes for D2D communications, four subframes are configured for transmissions from UE1 to UE3 while the other four subframes are configured for transmissions from UE3 to UE1. The relative locations of the network node, UE1, and UE3 may be referred to those depicted in FIG. 1. That is, the distance between the UE3 and the network node is longer than the distance between the UE1 and the UE3 and the distance between the UE1 and the network node. As shown in FIG. 6, the $5^{th}$ subframe at UE1 would overlap the $6^{th}$ subframe which is used for D2D data reception from UE3. From the report, the network node is able to determine that the D2D transmission/reception would interfere with the normal transmission/reception at UE1, so it may configure UE1 to use only a few resources which would not overlap the $6^{th}$ subframe or even skip using the $5^{th}$ subframe for normal UL transmission.

Note that those skilled in the art may make modifications and/or alterations according to the processes 40 and 50. Such modifications and/or alterations should also be within the scope of the present invention. For example, the information about the arriving time related to the first signal may be the difference between the time that the UE sends a normal UL transmission and the time this UE receives the first signal. In another example, the information about the arriving time related to the first signal may be the difference between the time that the network node receives a normal UL transmission from the UE and the time this UE receives the first signal. Or, the information about the arriving time related to the first signal may be the difference between the time that the UE receives a normal DL transmission and the time this UE receives the first signal. In addition, all information in the report may be represented by quantified values.

The information about prospective resource allocation of the first UE may be one or more indications which notify the network whether the subframes before a D2D transmission or a D2D reception can be used for normal UL transmission or not. Alternatively, the information may include one or more values which notify the network about the amount of resources in the subframes before a D2D transmission or a D2D reception that are available for normal UL transmission. In another example, the information about prospective resource allocation of the first UE may be one or more indications which notify the network whether the subframes after a D2D transmission or a D2D reception can be used for normal UL transmission or not. Alternatively, the information may include one or more values which notify the network about the amount of resources in the subframes after a D2D transmission or a D2D reception that are available for normal UL transmission. Two or more kinds of information mentioned above may be combined together in the report sent to the network.

The report may be sent to the network periodically. The period for the UE to report to the network may be determined by the UE itself or by the network. In other examples, the report may be sent to the network in response to a command or a request received from the network. Such kind of report may be transmitted aperiodically. Another example is that the report may be sent to the network when a specific condition or a certain criterion is met at the UE. For example, the UE is triggered to transmit the report when a time difference exceeds a threshold. The specific condition or criterion may be determined by the UE and/or by the network.

After the connection for D2D communication between the first UE and the second UE has been set up, the first UE may report to the network node at least one of the information about an arriving time related to a second signal received from other UEs (the second UE or the third UE) and/or the information about perspective resource allocation. The second signal may be some other signal than a discovery signal, such as a reference signal and/or a control/data resource block of the reporting UE itself. Examples of the reference signals may include, but is not limited to, a cell-specific reference signal (RS), a demodulation reference signal (DM-RS), a sounding reference signal (SRS), or a channel state information reference signal (CSI-RS).

The modifications and alterations related to the first signal mentioned previously may also apply to the second signal. As for the arriving time of the second signal, the UE may take at least one of the following time points for estimation: the time when the UE receives the second signal, the time that the UE receives a subframe of the second signal, and/or any other reference point in relation to the time that the UE receives the second signal. The information about the arriving time related to the second signal and/or the prospective resource allocation of the UE may be sent to the network periodically. In some examples, it may be sent in response to a command or a request from the network (aperiodic reporting) and/or according to UE decisions (e.g. when a time difference exceeds a threshold).

After receiving the report, the network node performs an estimation on whether a D2D subframe at the first UE could possibly overlap a normal uplink subframe according to the information obtained from the report. Then, the network node may configure or adjust the timing resource for D2D communication between the UEs by considering the reported information from the UEs and/or the timing advances TA1, TA2, and TA3 of the UEs.

Figure 7:
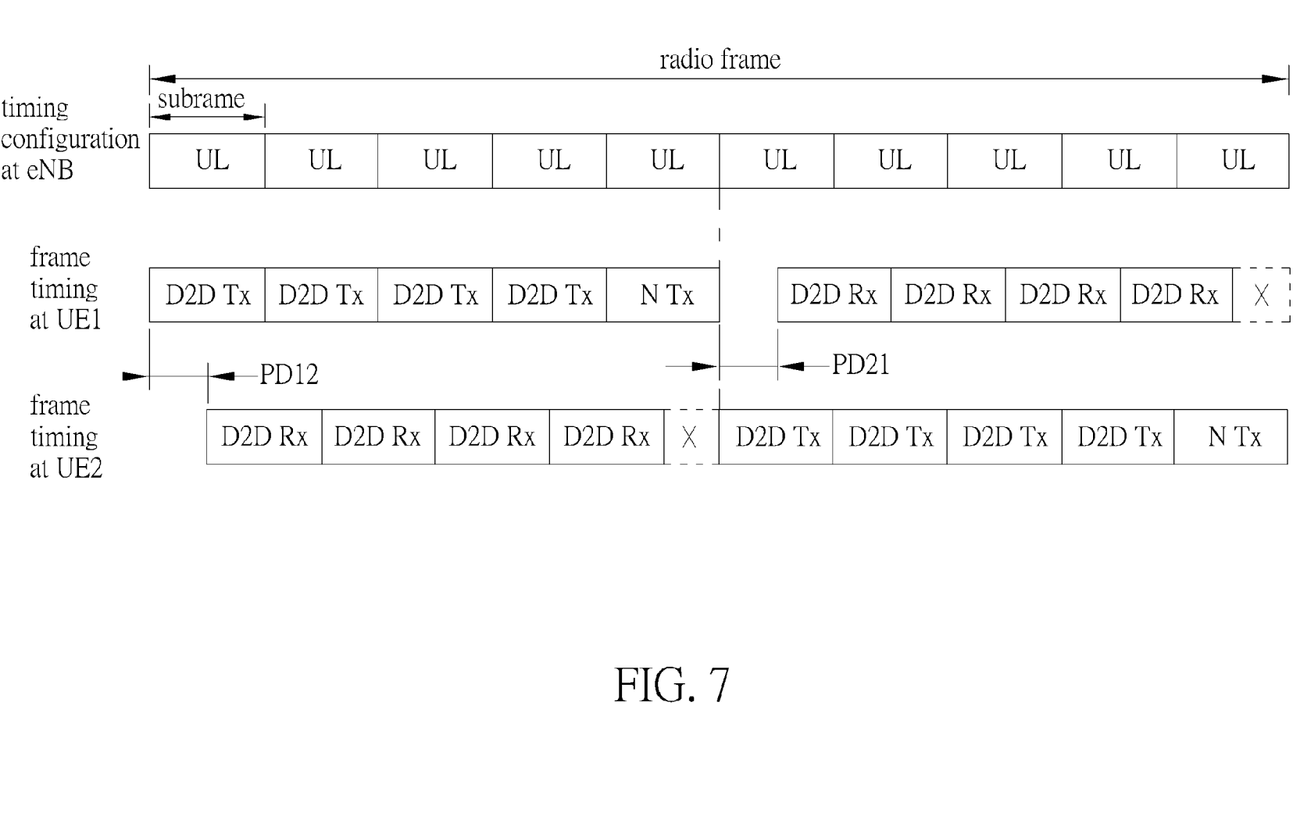
FIG. 7 is a timing diagram for the network node and the communication devices in the wireless communication system shown in FIG. 1 according to another example of the present invention.
Figure 8:
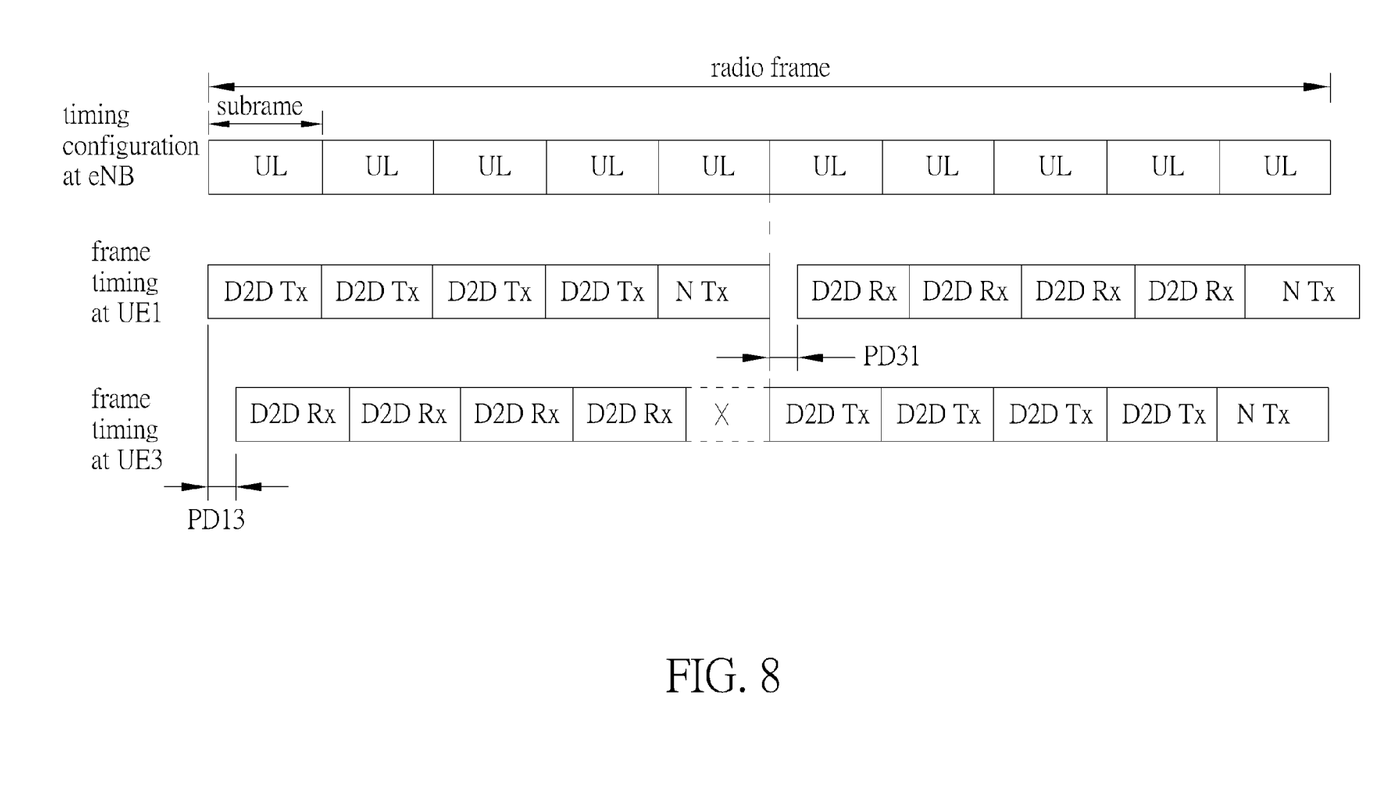
FIG. 8 is a timing diagram for the network node and the communication devices in the wireless communication system shown in FIG. 1 according to another example of the present invention.

FIG. 7 and FIG. 8 show examples of frame timing at the network node and the UEs UE1-UE3 as depicted in FIG. 1, where the UEs are not configured with timing advances for data transmission. That is, there are no timing advances TA1, TA2, and TA3 for UE1, UE2, and UE3 when the data for both D2D communication and normal communication are transmitted. The UEs and the network may be configured to perform similar steps as the abovementioned examples. Each UE may be configured to transmit or broadcast a first signal for building up synchronization between UEs involving D2D communication. The UE who receives the first signal from other UE may report to the network node at least one of information about an arriving time related to the first signal and information about prospective resource allocation of the first UE. Consequently, the network node may configure timing resource for D2D communication between the first UE and the second UE according to the reported information from the UEs, thereby avoiding data collision between D2D communication and normal communication.

As for the example shown in FIG. 7, the 5th subframe at UE1 would not overlap the 6th subframe which is used for D2D data reception from UE2. From the report, the network node is able to determine that the D2D transmission/reception would not interfere with the normal transmission/reception at UE1, so it may configure UE1 to utilize the 5th subframe for uplink transmission to the network. As for the example shown in FIG. 8, the 5th subframe at UE1 would not overlap the 6th subframe which is used for D2D data reception from UE3, so the network node may configure UE1 to utilize the 5th subframe for uplink transmission to the network. However, the $10^{th}$ subframe at UE1 would overlap the following subframe (if there is any transmission is configured in the following subframe). From the report, the network node is able to determine that the normal transmission/reception at UE1 in the $10^{th}$ subframe would interfere with the following transmission, so it may configure UE1 to use only a few resources which would not overlap the following subframe or even skip using the 10th subframe for normal UL transmission.

The steps of the processes 40 and 50 including suggested steps, alterations and modifications may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20.

In the prior art, the network node does not know whether the transmission or reception for D2D communication and normal communication would overlap for a particular resource allocation. For one UE, the reception timing of D2D data from another UE may be too early to overlap the previous transmission. Therefore, inappropriate resource allocation may result in higher interference for UEs in D2D communication. In contrast, the present invention provides a method to configure timing resource so that data transmission/reception for D2D communication and normal communication do not interfere with each other. The UE receiving the discovery signal from other UEs reports to the network node the information about an arriving time related to the discovery signal and/or information about its estimation of prospective resource allocation based on the discovery signal. Thus, the network node is able to determine whether data collision would occur and appropriately configure or adjust the timing resource of the UEs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of configuring timing resource in device to device (D2D) communication for a first user equipment (UE), the method comprising:
receiving a first signal from a second UE; and
reporting to a network node at least one of an arriving time information and a prospective resource allocation information, whereby the network node configures timing resource for D2D communication between the first UE and the second UE;
wherein the arriving time information is an information about an arriving time related to the first signal sent from the second UE, and the prospective resource allocation information is an information about prospective resource allocation of the first UE;
wherein the prospective resource allocation information comprises at least one of an indication to the network node about whether a first subframe before a D2D transmission or a D2D reception is used and an amount of available resources in the first subframe.

2. The method of claim 1, wherein the first signal is a primary synchronization signal (PSS), a secondary synchronization signal (SSS), or random access (RA) preamble.

3. The method of claim 1, wherein the first signal is sent by the second UE periodically.

4. The method of claim 1, wherein the arriving time information comprises a difference between the time that the first UE sends an uplink transmission to the network node and the time that the first UE receives the first signal, a difference between the time that the network node receives an uplink transmission from the first UE and the time that the first UE receives the first signal, or a difference between the time that the first UE receives a downlink transmission from the network node and the time that the first UE receives the first signal.

5. The method of claim 1, wherein the first UE periodically reports to the network node at least one of the arriving time information and the prospective resource allocation information.

6. The method of claim 5, wherein the period of reporting to the network node at least one of the arriving time information and the prospective resource allocation information is determined by the network node or the first UE.

7. The method of claim 1, wherein the first UE reports to the network node at least one of the arriving time information and the prospective resource allocation information in response to a command or a request received from the network node.

8. The method of claim 1, wherein the first UE reports to the network node at least one of the arriving time information and the prospective resource allocation information when a specific condition or criterion is met in the first UE.

9. The method of claim 1, further comprising:
receiving a second signal from the second UE or a third UE; and
reporting to the network node at least one of an additional arriving time information and the prospective resource allocation information after the D2D communication between the first UE and the second UE is set up;
wherein the additional arriving time information is an information about an arriving time related to the second signal.

10. The method of claim 9, wherein the second signal is a cell-specific reference signal (RS), a demodulation reference signal (DM-RS), a sounding reference signal (SRS), a channel state information reference signal (CSI-RS), or a resource block.

11. A method of configuring timing resource in device to device (D2D) communication for a network node, the method comprising:
receiving a report from a first user equipment (UE) comprising at least one of an arriving time information and a prospective resource allocation information, wherein the first signal is a discovery signal sent to the first UE by a second UE;
performing an estimation on whether a D2D subframe at the first UE overlap a normal uplink subframe according to the report; and
configuring timing resource for D2D communication between the first UE and the second UE according to the estimation;
wherein the arriving time information is an information about an arriving time related to the first signal sent to the first UE by the second UE, and the prospective resource allocation information is an information about prospective resource allocation of the first UE.

12. The method of claim 11, wherein the first signal is a primary synchronization signal (PSS), a secondary synchronization signal (SSS), or random access (RA) preamble.

13. The method of claim 11, wherein the first signal is sent by the second UE periodically.

14. The method of claim 11, wherein the arriving time information comprises a difference between the time that the first UE sends an uplink transmission to the network node and the time that the first UE receives the first signal, a difference between the time that the network node receives an uplink transmission from the first UE and the time that the first UE receives the first signal, or a difference between the time that the first UE receives a downlink transmission from the network node and the time that the first UE receives the first signal.

15. The method of claim 11, wherein the prospective resource allocation information comprises at least one of an indication to the network node about whether a first subframe before a D2D transmission or a D2D reception is used and an amount of available resources in the first subframe.

16. The method of claim 11, wherein the first UE periodically reports to the network node at least one of the arriving time information and the prospective resource allocation information.

17. The method of claim 16, wherein the period of reporting to the network node at least one of the arriving time information and the prospective resource allocation information is determined by the network node or the first UE.

18. The method of claim 11, wherein the first UE reports to the network node at least one of the arriving time information and the prospective resource allocation information in response to a command or a request received from the network node.

19. The method of claim 11, wherein the first UE reports to the network node at least one of the arriving time information and the prospective resource allocation information when a specific condition or criterion is met in the first UE.

20. The method of claim 11, further comprising:
receiving another report from the first UE comprising at least one of an additional arriving time information and the prospective resource allocation information after the D2D communication between the first UE and the second UE is set up;
wherein the additional arriving time information is an information about an arriving time related to a second signal, and wherein the second signal is sent to the first UE by the second UE.

* * * * *